INVENTOR.
Robert W. Hart

Nov. 18, 1958     R. W. HART     2,861,256
INTEGRATING SIGNAL DETECTOR EMPLOYING
A RESONANT MECHANICAL SYSTEM

Filed April 16, 1956     4 Sheets-Sheet 2

INVENTOR.
Robert W. Hart
BY

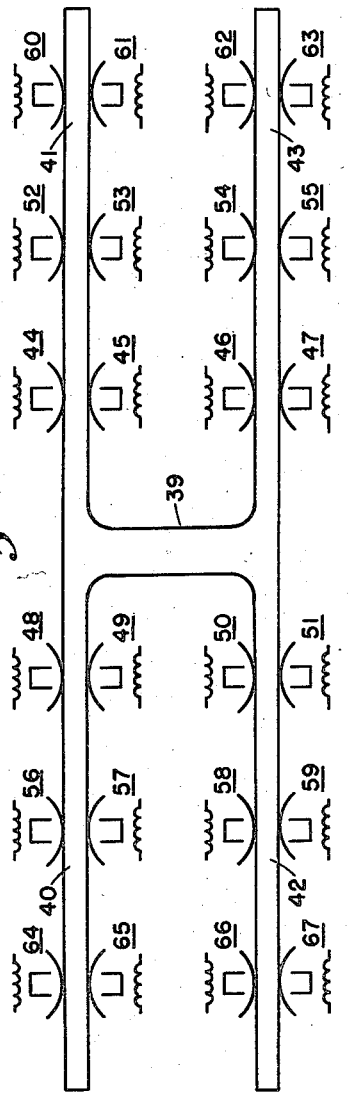
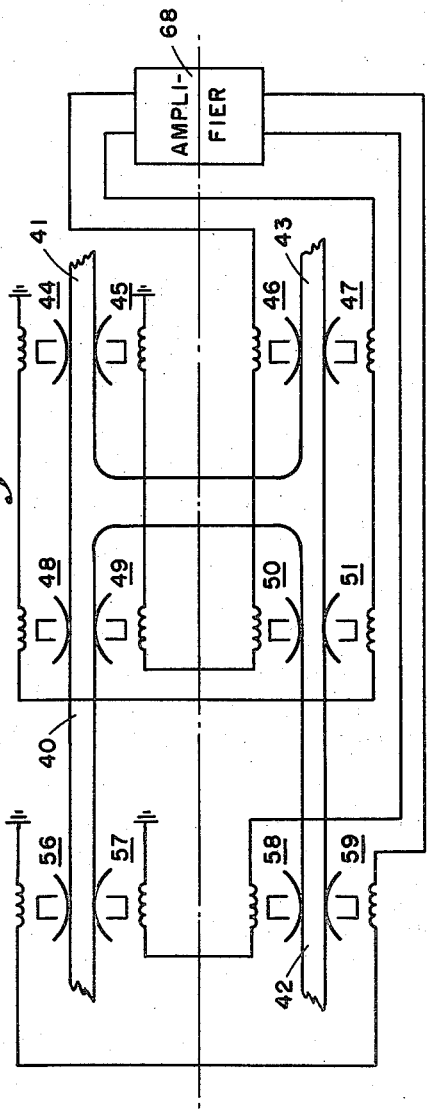

INVENTOR.
Robert W. Hart

United States Patent Office 2,861,256
Patented Nov. 18, 1958

2,861,256
INTEGRATING SIGNAL DETECTOR EMPLOYING A RESONANT MECHANICAL SYSTEM

Robert W. Hart, Lynn, Mass.

Application April 16, 1956, Serial No. 578,551

6 Claims. (Cl. 340—6)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for detecting signals of low frequency and, more particularly, to an integrator of low frequency signals employing a resonant mechanical system as a means of accumulating and storing signal energy. The apparatus is inherently capable of detecting small signals having a low frequency component in the presence of heavy random noise as contrasted with presently known detecting systems which, under the same conditions, would completely fail to recognize the small signals.

This invention is an improvement upon the signal detector described in U. S. Patent No. 2,561,366. The signal detector disclosed in that patent employed a tuned resonant system as a means for cumulatively storing energy. Since it was known that energy added to such a system in a random manner would not, in general, increase the amplitude of oscillation of the system, while energy added in synchronism and in phase with the oscillations of the resonant system would result in an increase in amplitude, that invention contemplated causing the signals to be detected to added energy to the system in synchronism and in phase with the oscillations thereof while extraneous signals were applied to the system in a random manner. The increased amplitude of oscillation of the resonant system being indicative of the energy added to the system, that invention employed the making and breaking of an electrical circuit by contacts to indicate the addition to the system of a predetermined amount of energy. Specifically, the signal detector described in that patent contemplated utilizing a mechanical resonant system vibrating at low audio frequencies. The high amplitudes inherent in a mechanical system vibrating at those very low frequencies made it feasible to employ electrical contactors, one of the contacts being fixed and the other contact being carried by the resonant device, to indicate when the amplitude had increased to a predetermined degree. At higher frequencies, however, the oscillatory amplitude of such a mechanical system is not large enough to permit the satisfactory use of electrical contacts and it is then necessary to devise other indicator means. Moreover, the use of contacts does not permit an indication of instantaneous signal trend since that means provides an output only when the added energy exceeds a preset level and cannot indicate an incremental increase beyond that level or a decrease which does not bring the amplitude below the preset level.

The earlier invention, because it depended on a low audio frequency resonant system, was provided with means for insuring that energy from the wanted signal was injected into the system in synchronism and in phase with the oscillations of the system. This was necessary because the wanted signal, generally, was of a higher frequency than the system frequency. However, it was realized that where the resonant frequency of the system could be appreciably extended into the higher frequency range the wanted signal could be generated so that the signal itself would be in synchronism with the oscillating system and hence synchronous energy injection means would not be needed. The invention disclosed herein is an improvement upon the signal detector described in U. S. Patent No. 2,561,366 and is embodied in a signal detector permitting a greatly extended upper frequency range and the measurement of signal trends. The improved signal detector is adapted for the reception of a signal having a unique characteristic. By a unique characteristic is meant a signal or a component of a signal which is consistent in frequency and phase over at least the period of integration of the signal detector.

In the original concept as disclosed in the aforementioned patent, all of the integration process was dependent on increase in amplitude of the vibrator. The number of cycles of integration was basically dependent on signal strength and at low signal levels the control mechanism was not easily effective. The improved invention combines a period of integration based on amplitude increase with a period of integration dependent on the velocity of wave motion along the vibrator.

Prior methods of selecting the unique characteristic of a signal and integrating it through the use of vibratory systems do not differentiate the effects of noise to the same order of magnitude as the invention described herein. The signal storage system described in the aforementioned U. S. patent is efficient but the time of signal integration, an important factor in the minimization of the effect of noise injected with the signal, is not readily determined. In contrast, the present invention provides a means for setting a minimum number of cycles of integration before an output indication occurs.

In general, a resonant system may be considered as an integrating system whereby discrete energy applied periodically and in phase with the oscillations of the system results in an integral of finite value. The application of energy applied randomly, on the other hand, results in an integral having a value substantially zero where the integration is performed over a sufficiently long period of time. Hence, in order that a resonant integrating system may disregard the effect of randomly injected energy, the integration time of the system must be at least of a minimum duration and preferably longer than that minimum.

The mechanical vibrating devices disclosed herein are normally driven to a constant amplitude at an unvarying frequency through special oscillator techniques. The losses in the mechanical vibrator while being thus driven are supplied in the process of driving. The sensitivity of the driven vibrator to external signal energy is a function of the amount of energy required to cause a change in the vibrator oscillations, and in oscillating mechanical vibrators very little external energy is required to cause a change. Oscillating mechanical vibrators are therefore very sensitive. The effects of successive small signal energies discretely injected into a mechanical vibrator are integrated over time, consequently, the limen of signal sensitivity is determined by the energy loss per cycle in the mechanical vibrator due solely to an increase in amplitude. Where the discrete energy injected per cycle is larger than this energy loss per cycle, an increase in amplitude results.

In accordance with the preferred embodiment of the invention, a pair of vibrating systems are driven to oscillate in phase at a fixed frequency; one of the vibrating systems is used as a "standard"; signal energy is injected into the other vibrating system which stores and integrates the injected signal energy. Preferably, but not necessarily, each of the vibrating systems comprises a pair of reeds with means associated therewith for driving the reeds to a constant amplitude at a fixed frequency. Additional means are associated with the other of the vibrating systems for adding energy derived from the wanted signal to that system to change the amplitude of the oscillating reeds. A comparator circuit is provided which compares the reed amplitude of the "standard" vibrating system with the reed amplitude of the other vibrating system.

In certain applications of the invention it is desirable to provide an indication of the detection of a signal after a predetermined minimum integration period. This is accomplished in the present invention by operating the mechanical vibrator at multinode frequencies so that signal energy added cyclically to the vibrating reed at an injection point travels by wave motion along the reed and is subsequently detected at a pick-off point located near the tip of the reed. For example, the mechanical vibrator may be operated at a frequency such that the distance from the injection point to the signal pick-off point is equal to 1000λ, where λ is the wave length on the reed at the operational frequency. As the frequency of the unique signal is identical with the operational frequency, it is apparent that 1000 cycles of signal energy can be discretely added before any indication in amplitude change is noted at the signal pick-off point.

The well known methods of storing synchronous signal energy in electrical tuned circuits, e. g., a parallel resonant circuit, do not provide a high skirt selectively—that is, if a signal is strong enough and of the proper frequency to be received, it is stored for a few cycles until the voltage across the tuned circuit reaches a point at which an indicator, such as a voltmeter connected across the circuit, is sensitive to it, but the optimum sensitivity of this system is only slightly different from the threshold at which no reception can occur. A tuned electrical circuit would be comparable with the mechanical system herein described if a high Q resonant electrical circuit were capable of storing several hundred cycles of signal before a positive indicator were actuated. Such an indicator would need be nonindicative during the integration period and then become suddenly and completely indicative.

The invention utilizes a tuned mechanical vibrator driven to a limited amplitude at the frequency of the desired signal. Energy from the signal is added cycle by cycle to that contained in the vibrator causing an increase in amplitude. The amplitude will continue to increase so long as the increments of signal energy exceed the increments of loss per cycle in the vibrator. When the vibrator builds up to a predetermined amplitude, requiring synchronous increments of signal energy spread over a known number of cycles, the vibrator triggers an indicator which provides an output result. The vibrator is driven at a predetermined frequency and the signal is known to have a component at that frequency. The successful operation of the invention requires that this component endure in phase with the vibrator for a minimum number of cycles to insure a high degree of signal selectivity as well as sensitivity. Since the signal contains unique qualities and the background noise does not, the integrator tends to disregard the presence of noise. Noise plus signal is injected on one side of the integrator and noise only on the other. Though the noise sources may not represent the identical noise in both phase and amplitude, the pattern will be compatible over the integration period and since the two noise sources oppose each other in their effect on the vibrator, the integrator tends to reject noise by differentiation.

It is an object of the invention to provide a sensitive, highly selective detector of low frequency signals.

Another object is to provide a signal detector employing a vibrating system which combines a period of integration based on amplitude increase with a period of integration based on the velocity of wave motion along the vibrator.

It is an object of the invention to provide a signal detector capable of detecting small signals in the presence of heavy random noise.

A further object is to provide means for detecting a minute signal which persists for a predetermined minimum time.

It is a further object of the invention to provide a signal detector employing a pair of driven vibrating systems in which the problem of maintaining both systems at a fixed resonant frequency is effectively solved.

Still another object is to provide means for comparing the amplitude of a "standard" driven vibrator with the amplitude of a driven signal integrating vibrator, thus eliminating drive power as a factor.

An additional object of the invention is to extend the technique of a vibrating reed integrator to higher frequencies than could hitherto be commodated.

Additional objects of the invention are to provide a device which:

(1) Requires a unique characteristic in the wanted signal, defined as consistency in frequency and phase over the period of integration;

(2) Recognizes the unique quality of the signal to a high degree and selects its integration while rejecting other signals;

(3) Is incidentally capable of selecting between two signals which are of the same frequency but differ in phase;

(4) Effectively increases the signal-to-noise ratio of the received signal to a high degree while maintaining a sensitive condition to the signal; and (5) Rejects all signals of a frequency differing from the wanted signal by an amount proportional to the integration period.

Other objects and many of the attendant advantages of this invention will be more readily appreciated as the invention becomes better understood by reference to the detailed exposition following and to the accompanying drawings wherein:

Fig. 8 is a schematic drawing of a preferred arrangement of the magnetic units associated with the vibratory reed system (each magnetic unit is symbolized by  );

Fig. 9 illustrates a self-excited drive system which may be utilized to maintain the reed system vibrating at the desired frequency;

Figure 1:
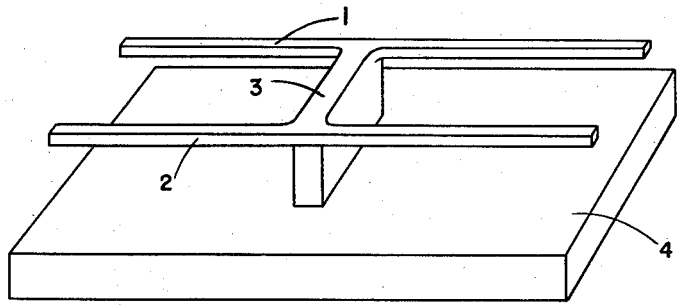
Fig. 1 is a perspective view of a vibratory reed system and depicts a pair of mechanically tuned reeds suspended at their longitudinal centers in a manner enabling the reed ends to vibrate freely.
Figure 2:
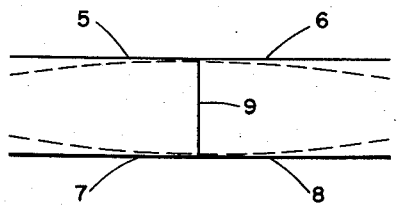
Figs. 2 to 5 are included to elucidate an analysis of the vibratory reed system.
Figure 4:
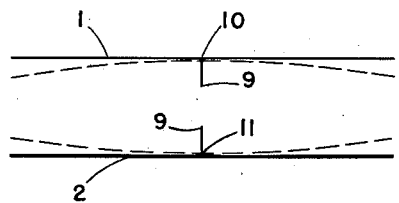
Figure 3:
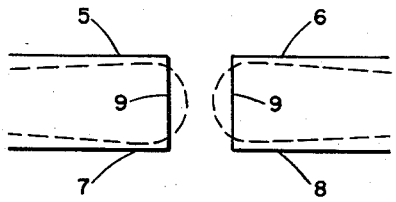
Figure 5:
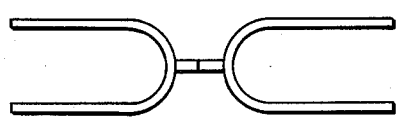

Referring now to Fig. 1, there is depicted a pair of reeds 1 and 2, mechanically tuned to vibrate at the same natural frequency, suspended at their longitudinal centers from support 3, forming part of a base 4 which is of a weighty construction. Magnetic drive units of a type later described herein are arranged to cause the reeds to vibrate with equal amplitudes so that reed 1 forms a bent bar downward as viewed in Fig. 1 at the time that reed 2 forms a bent bar upward. The reaction at the support 3, hence, is minimized in two degrees of freedom. That is, a minimum resultant force is transmitted to the support 3 in a direction at right angles to the longitudinal axes of the reed vibrators and a minimum of motion coupling is transmitted between the halves of the vibrators to the left and right of the support 3. The reason for minimization of the reactive force can be better apprehended by reference to Figs. 2 to 5. In Fig. 2 the reed 1 is shown to consist of halves 5, 6 and reed 2 is shown to consist of halves 7, 8, the reeds being joined at their midpoints by a line 9 representing the support 3. Now, by passing a parting plane longitudinally through the support, the separate left and right halves of Fig. 2 can be represented as shown in Fig. 3 where the broken lines indicate an arbitrary position assumed by the reeds while vibrating. It will be noted that the curvature of the support 9 of the left half is equal in amplitude and opposite in direction to the curvature of support 9 of the right half and, therefore, the assembly shown in Fig. 2 will result in cancellation of the forces acting on the support; hence, the support may be represented as a straight line. Where reeds 1 and 2 are analyzed separately by severing the support 9, as shown in Fig. 4, it is evident that as reed 1 vibrates its midpoint 10 will tend to move at right angles to the longitudinal axis in order to oppose vibrational acceleration. Similarly, the midpoint 11 of reed 2 will tend to move at right angles for the same reason. Since reed 1 is vibrating with equal amplitude and in phase opposition to reed 2, the midpoint forces will cancel through the support 9. Mechanically, the system is comparable to the two tuning forks in Fig. 5 which are mounted in the same plane, prong axes parallel, and their butts aligned and in contact.

It has been shown that where the left and right halves of the vibratory system of Fig. 2 are oscillating in phase with equal amplitudes the system is in equilibrium. Now, if the right half 6, 8 were caused to vibrate at the same frequency with increased amplitude, the forces acting on the support 9 would no longer be in equilibrium and the motional coupling through the support from the right half to the left half would normally cause the vibrational amplitude of the left half to be reduced. The degree of motional coupling between those halves is readily controlled through the physical proportioning of the support 9. For example, a stiff support will transmit less motional coupling, whereas a pliant support will transmit more motional coupling. Moreover, when the system of Fig. 2 is vibrating at multinode frequencies, the phase of the motional coupling can be controlled by selecting a support having a particular configuration related to the wave length at the multinode frequency.

Figure 6:
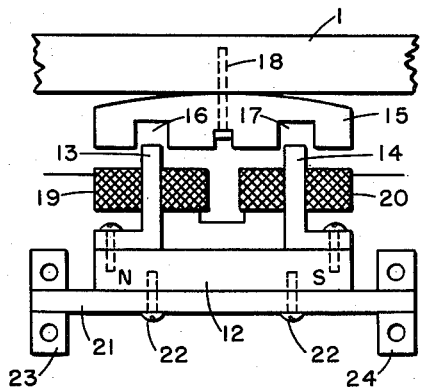
Figs. 6 and 7 depict varied forms of magnetic units adapted to be used in conjunction with the vibratory reed system.
Figure 7:
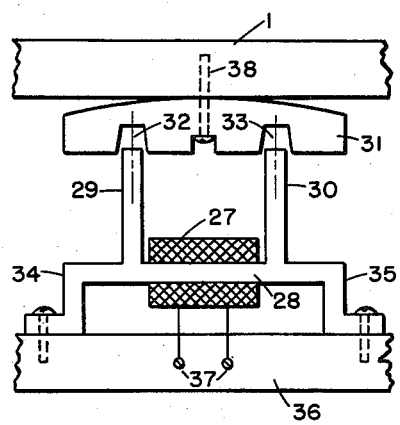

Before proceeding with an exposition of the preferred embodiment of the invention, it will be advantageous to refer to Figs. 6 and 7 which illustrate various constructions of a magnetic unit and wherein all coils are shown in section, for clarity of detail. As shown in Fig. 6, the drive unit comprises essentially four elements: a U-shaped magnetic core, a curved armature secured to a reed 1, a signal coil wound on the core, and a bracket on which the core is mounted. The U-shaped core consists of a permanent magnet 12 on which are mounted forwardly projecting poles 13, 14. Armature 15, of magnetically permeable material, is provided with recesses 16, 17 for the reception of the poles. The armature has a curved face which is abutted against reed 1 to which the armature is secured by any suitable securing means, such as screw 18. Signal coils 19, 20 are closely wound about poles 13, 14, respectively, and are connected in series. It will be appreciated that the two coils could be replaced by a single coil if desired, but it appears that greater efficiency is obtained by placing a portion of the signal coil on each pole. A bracket 21 is provided on which the magnet 12 is mounted by screws 22. The bracket is equipped with flanges 23, 24 adapted to be secured to a heavy base. The bracket should be sufficiently rigid to withstand the forces exerted on it by the U-shaped core without any motion being imparted to the bracket.

U. S. Patent No. 2,730,665 to R. W. Hart, may be referred to for further information concerning the operation and construction of a magnetic unit of the type described above. In addition, Figs. 3B, 3C, 4 and 5 of that patent illustrate modifications in the shape of the armature and ends of the poles that may be employed to modify the forces exerted on the armature as it moves with respect to the U-shaped core.

It is apparent that the construction of Fig. 6 may be modified so that an electromagnet consisting of a coil surrounding a permeable core may be employed in lieu of a permanent magnet.

A detailed view of another variety of magnetic unit is shown in Fig. 7. The unit consists of a coil 27 surrounding a magnetically permeable core 28 having a pair of forwardly projecting poles 29, 30. An armature 31 of permeable material, having slots 32, 33 therein adapted to receive the poles 29, 30, is secured to the reed 1 by any suitable means, here shown as a screw 38. The core 28 is provided with brackets 34, 35 to facilitate its mounting on a support 36 suitably secured to a heavy base. When employed as a pick-up unit, a D. C. current applied to the coil 27 through terminals 37 sets up a polarizing field and the vibration of the reed carrying the armature generates an alternating current in the coil.

Fig. 8 diagrammatically represents a preferred embodiment of the low frequency electrical signal integrator employing magnetic units of the type depicted in Fig. 6. In Fig. 8 and certain of the figures following, it is to be understood that the magnetic units are symbolically indicated: the signal coil being designated by ∽, the magnetized core by ⊓, and the armature by ⌣. The vibratory system of Fig. 8 is in the form of an H and is composed of a pair of reeds supported at the cross bar 39. As previously explained, the reactive forces due to the vibrations of the reeds cancel in the cross bar and, hence, the cross bar 39 is at rest so far as the reeds are concerned. For this reason each arm of the H to the left and to the right of the cross bar 39 can be considered as a separate reed, and accordingly, the arms are hereinafter separately designated as reeds 40, 41, 42 and 43, respectively.

Associated with each reed, 40, 41, 42, 43 is a pair of magnetic units acting in push-pull to drive the reed at a predetermined frequency. These drive units are designated by numerals 44 to 51, inclusive, and the drive system is discussed in detail below in connection with Fig. 9.

Also associated with each reed is a second pair of magnetic units connected in push-pull. These units are designated by numerals 52 to 59, inclusive. Four of these units on one side of the crossbar 39 are excited by the received signal and impart signal energy to their associated reeds. The signal insertion system is more completely described below in connection with Fig. 10. The four units on the other side of the crossbar are employed as a means for exciting the drive system and their operation is more fully described herein.

In order that the results of signal integration may be observed, magnetic units 60 to 67 are associated with the reeds near the outer tips thereof, as shown. These signal pick-up units derive excitation from the vibrations of the reeds 40, 41, 42, 43 and through circuitry presently to be described the detection of a signal is indicated.

The drive units, signal insertion units, and signal output units may be identical in construction to the units displayed in Figs. 6 and 7. Before the vibratory system is set into oscillation, each push-pull pair of magnetic units is adjusted so that each of the paired units exerts an equal attraction on its associated reed when the reed is centered between the paired units. The centered position will hereinafter be referred to as the rest position.

Fig. 9 is a schematic diagram of the drive system circuitry. The signal coils of drive units 45, 49, 50, 46, are connected together, and are energized from one output side of a push-pull amplifier 68. The signal coils of drive units 44, 48, 51, 47 are connected together and are energized from the other output side of the push-pull amplifier. The amplifier 68 is of a conventional type designed to pass the frequencies involved. The output from this amplifier delivers energy to the magnetic units and, since the output is push-pull, the signal coils of drive units 45, 49, 50, 46, are excited in opposite phase from the signal coils of drive units 44, 48, 51, 47. Hence, when certain of the drive units are pulling on the reeds, the other drive units are, in effect, pushing, so that all the drive units contribute to the vibration of the reeds. For example, when the excitation current applied to drive units 45, 49, 50, 46 is of a phase such as to strengthen their magnetic fields, these units exert an increased pull on the reeds; the excitation current simultaneously applied to drive units 44, 48, 51, 47, being of opposite phase, causes a corresponding weakening of their magnetic fields and these units exert a decreased pull on the reeds. Since a decrease in pull on the reeds is, in effect, a push, the units operate to drive the reeds in push-pull. It should be obvious that either phased set of drive units could be eliminated so that the reeds are driven only during a half cycle of vibration, but a push-pull method is preferred because it provides a more efficient and stable drive.

Magnetic units 56, 57, 58, 59 are used to supply synchronous excitation to the amplifier 68, whereby the vibratory reed system is self-excited in the illustrated embodiment. Assuming that reeds 40, 42 have been set into oscillation in any fashion, the changing position of the armatures carried by vibrating reeds 40, 42, produces a varying magnetic field in the cores of units 56, 57, 58, 59 which induces a voltage in the signal coils of each of the units. When, for example, those portions of reeds 40, 42 carrying the armatures of magnetic units 56, 57, 58, 59 are simultaneously moving inwardly toward the center line of the vibratory system, the armatures of units 57, 58 narrow the air gap between each of those armatures and its associated stationary magnetic core whereby the magnetic field in the core is enhanced causing in-phase voltages to be generated in the signal coils of units 57, 58. Since the signal coils of units 57, 58 are serially connected to one input side of amplifier 68, those voltages are additive. As a corollary, the armatures of units 56, 59 will concurrently widen the air gap between each of those armatures and its associated stationary magnetic core whereby the magnetic field in the core is weakened causing voltages to be generated in the signal coils of units 56, 59. Since the signal coils of units 56, 59 are serially connected to the other input side of amplifier 68, those voltages are additive and in phase opposition to the voltage generated by units 57, 58. Hence, a push-pull excitation is supplied to the input of amplifier 68. The output of amplifier 68 is utilized to drive the reed assembly. The reed assembly, after having been set into oscillation, will tend to vibrate at an amplitude such that the energy injected by the drive units is dissipated in the oscillating system. Therefore, by adjusting the input of amplifier 68, the reed amplitudes can be controlled. A local oscillator could be used in lieu of the self-exciting system but it has been found to be difficult in practice to generate the extremely steady low frequency signal required.

Figure 10:
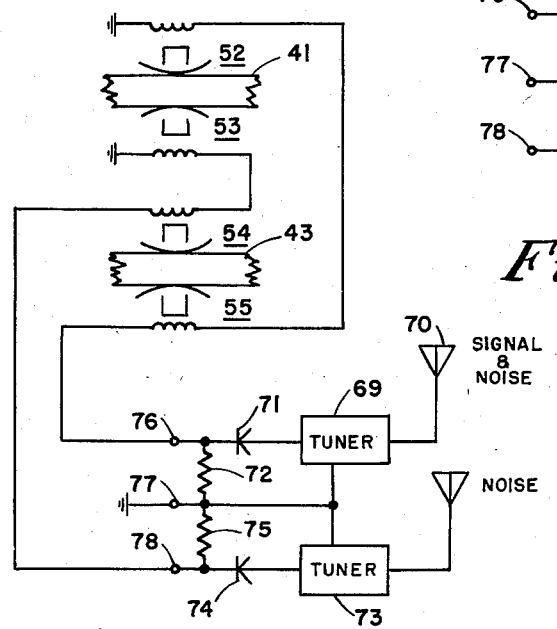
Fig. 10 shows a scheme for injecting signal energy into the vibrating reed system in a manner which effectually nullifies the effect of noise.

Fig. 10 depicts the signal injection portion of the invention. A tuner 69 is provided with an associated antenna 70 to receive the signal plus whatever noise arrives with the signal. The output of tuner 69 is rectified by any suitable device 71 and a signal current is thereby developed in resistor 72. A second tuner 73 is provided whose output is similarly rectified at 74 to produce a signal current in resistor 75. Tuner 73 is slightly detuned to reject the signal and, hence, only noise is accommodated. The signal coils of magnetic units 55, 52 are connected between terminals 76, 77, and these units impart signal-plus-noise energy to the reeds 41, 43. The signal coils of magnetic units 53, 54 are connected between terminals 77, 78, and these units impart noise energy to reeds 41, 43 in opposition to the noise energy in the signal circuit. The signal is such that it contains a major component of energy whose frequency is the same as that of reeds 41, 43. If the noise from tuner 73 is selected to insure compatibility with that which is associated with the signal over the period of integration, the noise energies will balance out. Noise energy in the signal source, when impressed on a reed, will momentarily tend to vibrate the reed in one direction while noise energy from the compatible source will oppose this tendency. The noise spectrums of the two sources need not be in phase, but the total energy contained in these sources must be equal in magnitude over the period of integration. The wanted signal, if in phase with the reed vibrations, will add energy to the vibrational system, resulting in an increase in amplitude of vibration. The signal need have only an amount of energy per cycle exceeding the losses in the reeds per cycle to result in signal detection. Because the reeds are maintained in optimum vibration from a local source, the energy required is solely that necessary to cause an increase in reed amplitude.

This invention contemplates that the wanted signal will be generated at the frequency of the vibrating system and in phase therewith. This necessitates a means of synchronizing the remote signal generator with the signal detector. It is appreciated that where the signal is propagated through the ionosphere a phase shift will result in the signal the extent of which cannot be readily determined. In this circumstance, it is manifest that a phase-shifting device may be employed at the signal integrator to insure that the wanted signal is injected in phase with the reed vibrations.

The above description of the operation of the signal injection portion of the invention is predicated upon the externally generated wanted signal having a frequency identical with that of the vibrating system. This, of course, requires that the external signal be generated at a precise frequency and that its frequency lie within the frequency capabilities of the driven vibrating system of the signal detector. The invention may be modified by the addition of a synchronous injection system, such as is described in Patents Nos. 2,561,366 and 2,730,665, to detect signals which have frequencies differing from the driven vibrating system frequency. The manner in which this invention may be so modified will become apparent by reference to those patents.

The foregoing describes the principle of injecting a signal which is to be detected by a process of integration. It is apparent that the effects of noise may be greatly reduced by opposing the noise associated with the signal with a compatible quantity of noise adjusted to result in a minimum of influence upon the vibrating system. By this method the signal will be integrated practically in the absence of noise. Successive small quantities of signal energy added to the energy already stored in the vibrating reeds gradually cause an increase in reed amplitude. Where, for example, the signal is injected midway along a reed and there are ten vibrational nodes between the point of injection and the end of the reed, the point of injection will increase in amplitude as the signals are successively impressed but ten successive cycles will occur before a change in amplitude appears at the outer end of the reed. Thus, the integrator has what is termed a "cushion" of ten cycles before the presence of a signal is indicated and the invention insures, in this case, the integration of at least ten cycles. An additional period of integration may be obtained by requiring a predetermined amplitude excursion of the reed before the signal is indicated. Where the integrator is tuned to a higher frequency, it is feasible to have a "cushion" of 1,000 cycles or more before any change in amplitude appears at the reed tip. On the other hand, at lower frequencies the reed would need be of great length to obtain any considerable "cushion." Fortunately, at low frequencies, amplitudes of mechanical vibrating systems are usually high and indicators of a gross type, such as described in U. S. Patent No. 2,730,665, are permissible.

In connection with the location of the signal injection point, one must understand that the energy added to the reed, cycle by cycle, spreads by wave motion longitudinally along the reed in both directions, that is, toward the mid-support of the system as well as toward the tip of the reed. If the signal is injected midway of the reed, a wave will reach the drive point at the same time that a wave travelling in the opposite direction nears the reed tip. This imposes a design requirement that the signal injection point be properly located to insure that the waves travelling toward the mid-support are in phase with the drive system at the drive point. In order to obtain maximum effective selectivity of the wanted signal, the nodes in the vibrating reeds must be well defined so that there will be a minimum opportunity for the drive units to impose a favorable vibration other than at the discrete point of energy insertion. To assist in this purpose, the magnetic armatures are curved so that they bear on the reeds at one place only, thus permitting the reeds to vibrate without restraint. At multi-node frequencies, a very sharply defined insertion point is desirable.

Figure 11:
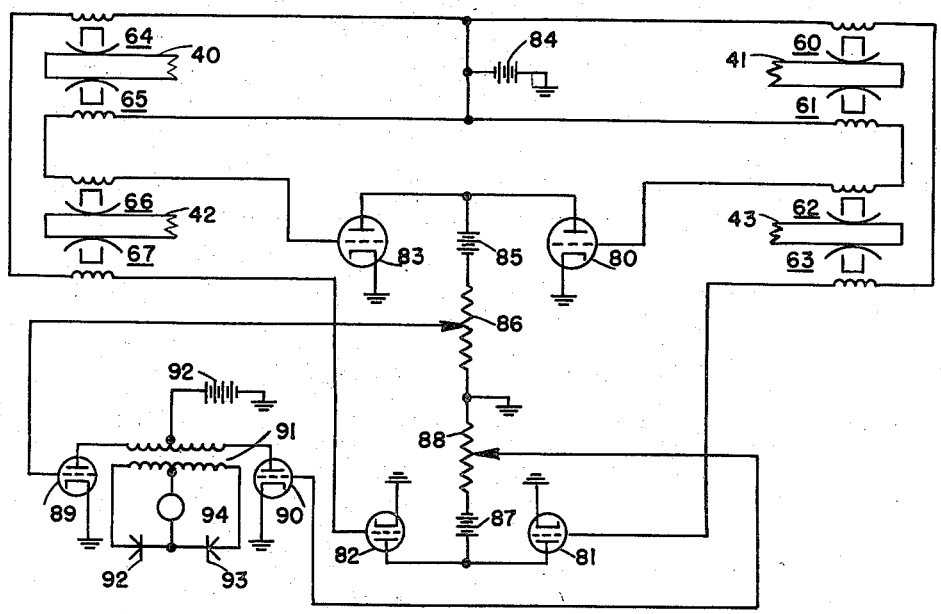
Fig. 11 is a schematic representation of the preferred system for obtaining an output indication.

Shown in Fig. 11 is the circuitry for detecting the arrival of signal at the tips of reeds 41, 43. The reader can readily apprehend that it is not vital that both reeds be utilized to detect the signal, since one reed can serve that purpose, although better sensitivity is achieved by utilizing both reeds.

Reeds 40, 42 are normally driven as previously described and do not receive additional energy from an injected signal, hence their amplitude is taken as a reference point. In the absence of an injected signal, reeds 41, 43 will vibrate in synchronism and with the same amplitude as reeds 40, 42. Under these conditions, the output of the signal pick-up units 60, 61, 62, 63, associated with the reeds 41, 43, and the output of signal pick-up units 64, 65, 66, 67, associated with reeds 40, 42, may be differentiated to obtain a zero signal resultant.

The signal coils of pick-up units 60, 63 are connected in series to the grid of amplifying tube 81; the signal coils of pick-up units 61, 62 are connected in series to the grid of amplifying tube 80; pick-up units 64, 67 have their signal coils similarly connected to amplifying tube 82; and pick-up units 65, 66 are serially connected through their signal coils to the grid of amplifying tube 83. Because the four tubes are operated class A, a source of grid bias is provided by the battery 84. The four tubes are connected to form a bridge circuit and serve to isolate the pick-up units from the indicator portion of the circuit. Tubes 80, 83 have their plates connected to a potential source, here symbolized by battery 85, which is returned to ground through resistor 86. In similar fashion, the plates of tubes 81, 82 are connected to another potential source, indicated by battery 87, which is returned to ground through resistor 88.

The voltages generated in the signal coils of units 60, 63, due to the vibration of reeds 41, 43, will be equal in amplitude and opposite in phase to the voltages generated in units 61, 62. Consequently, tubes 80, 81 will be excited in push-pull. Similarly, units 64, 67, due to the vibration of reeds 40, 42, will have induced in their signal coils voltages equal in amplitude and opposite in phase to those induced in the signal coils of units 65, 66. Therefore, the grids of tubes 82, 83 will be excited in push-pull. The purpose of the bridge circuitry is to detect the difference in amplitude of reeds 41, 43 as compared with reeds 40, 42. If the reed amplitudes are alike, as in the case where no signal is injected, then it is desired that no signal be indicated. The operation of the bridge circuit is such that tube 80 is excited in opposite phase to tube 81 and tube 82 is excited in opposite phase to tube 83. The combined outputs from these tube pairs should normally produce a zero current resultant because a current increase through one tube is offset by a corresponding decrease in current through the other tube of the push-pull pair. A direct coupled amplifier comprising tubes 89, 90 is coupled to the output of the bridge circuit in a manner permitting flexibility of adjustment and to increase the limen of sensitivity. The plate circuits of tubes 89, 90 are connected through the center tapped primary winding of transformer 91 to the plate power supply here represented by battery 92. When the amplitude of reeds 41, 43 exceeds the "standard" amplitude, as they will after receipt of a signal, the bridge balance is upset and a differential output obtains in the bridge circuit. Normally an increase or decrease in plate current of 89 caused by an unbalance of the bridge circuit will be accompanied by a corresponding reduction or increase in plate current of 90 so that the tubes operate in push-pull. The current induced in the secondary winding of transformer 91 is rectified at either 92 or 93, depending on the instantaneous polarity of the induced voltage, and an indication is obtained on the indicator 94. In practice, different types of indicators may be employed. For example, a relay in the indicator circuit may be utilized to trigger an alarm device or actuate a teletypewriter unit.

It is sometimes desired to obtain an indication as soon as reeds 41, 43 exceed in amplitude the "standard" represented by the amplitude of reeds 40, 42. For this purpose, the grid voltage of 89 may be adjusted through a variable tap on resistor 86 in the output portion of the bridge circuit and the grid voltage of 90 may be adjusted in a similar fashion through a variable tap on resistor 88. The bridge circuit is designed so that only a differential voltage representing the difference in amplitude of reeds 41, 43, as compared with reeds 40, 42, appears across resistors 86, 88. Since the grid of tube 89 is excited from resistor 86 and the grid of tube 90 is excited from resistor 88, the differential voltage existing across those resistors will cause the voltage on the grid of tube 89 to be 180° out of phase with the excitation of tube 90 and the tubes will operate in push-pull.

Figure 12:
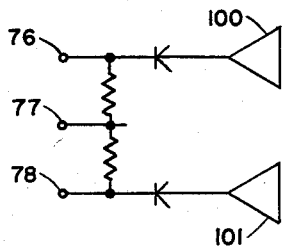
Fig. 12 is directed to apparatus for detecting acoustic signals.

The invention has thus far been described with reference to the detection of an electromagnetically propagated signal. This course has been pursued solely for an expository purpose as the invention has much wider applications than merely the detection of radio signals. For example, the invention can be used in underwater signalling by utilizing a hydrophone array, such as is shown in Fig. 12, to receive an acoustic signal. The signal is made to contain a frequency component identical with the frequency of the signal integrator vibratory system by modulating a supersonic source or the signal itself can be radiated at the vibratory system frequency. The signal is picked up by hydrophone 100 together with its accompanying noise. Hydrophone 101 is designed to be responsive to compatible noise but not to the signal. This acoustic system then operates as a signal source for the signal integrator in a manner similar to that of the radio receiving system heretofore described in connection with Fig. 10.

The invention has particular application in industrial control because of its attributes of detecting trends and its effective long time constant which acts to smooth out irregular effects so that a produced material can be correlated with a "standard" sample. The signal input circuit to the signal integrator can be designed to generate an electrical signal through the use of transducers sensitive to the property of the product under observation. The output circuit of the invention can be designed to actuate corrective controls based on trends or persistence of trends whereby the produced material will be brought into uniformity with the sample.

Figure 13:
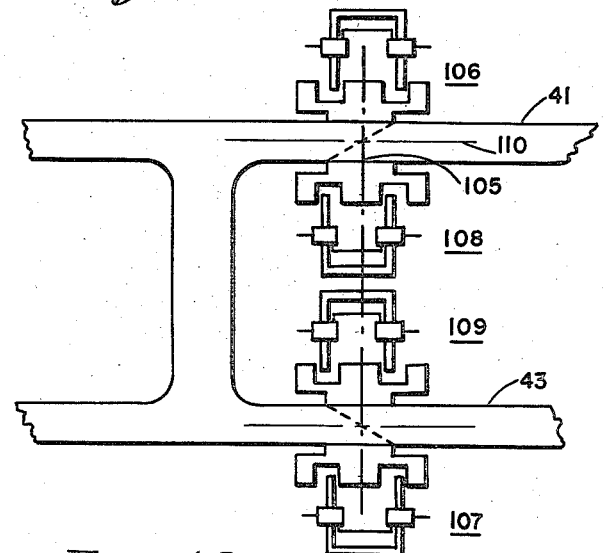
Fig. 13 illustrates an alternative arrangement of a magnetic drive unit whereby oscillations are produced by a shear mode drive.

Fig. 13 illustrates an alternative drive system in which pairs of magnetic units are arranged to impart vibration to the reeds 41, 43 by producing a couple about an axis 105 transverse to the reeds. The poles of the magnetic units are positioned as shown with respect to their associated armatures so that mechanical energy is imparted about transverse axis 105. Magnetic units 106, 107 drive toward the right while units 108, 109 concurrently drive toward the left. A force couple is thereby set up in reed 41, for example, which acts to compress an element of the reed below longitudinal axis 110 and acts to elongate an element of the reed above that axis. The resultant tends to vibrate the reed in shear mode. This system is preferably used at higher frequencies where multiple node reed frequencies are desired.

Obviously many modifications and variations of the present invention are possible in the light of the above teachings. It is therefore to be understood that within the scope of the appended claims the invention may be practiced otherwise than as specifically described.

What is claimed is:

1. A signal integrator for detecting signals comprising first and second resonant elements turned to vibrate at the same frequency, driving means associated with said resonant elements adapted to cause said elements to vibrate in phase with a predetermined amplitude at a selected frequency, signal insertion means associated with one of said elements adapted to inject discrete signal energy into the associated element, signal pick-up means associated with each of said elements adapted to produce an output indicative of the vibrational amplitude of the associated element, comparator means coupled to the outputs of the signal pick-up means associated with said elements adapted to produce a differential output indicative of the difference in amplitude between said elements.

2. A low frequency signal integrator for detecting signals having a unique characteristic comprising first and second mechanical elements tuned to vibrate at the same natural frequency, each of said elements having a length which is an integral multiple of the wave length of the wanted low frequency signal, driving means associated with said first and second mechanical elements adapted to cause said elements to vibrate in phase with a predetermined amplitude at a selected frequency, signal insertion means associated with one of said vibrating elements adapted to inject discrete signal energy into the associated vibrating element, signal pick-up means associated with each of said elements adapted to produce an output which is indicative of the vibrational amplitude of the associated element, comparator means coupled to the outputs of said signal pick-up means adapted to produce a differential output indicative of the difference in amplitude between said vibrating elements.

3. A signal integrator for detecting low frequency signals in the presence of heavy random noise comprising, first and second resonant mechanical vibrators tuned to vibrate at the same frequency, driving means associated with said resonant vibrators adapted to cause said vibrators ot vibrate in phase with predetermined amplitudes at a selected frequency, a pair of signal insertion units associated with one of said vibrators, each of said units being adapted to inject discrete energy into the associated vibrator, signal reception means coupled to one of said units, a source of compatible noise coupled to the other of said units, signal pick-up means associated with each of said vibrators adapted to produce an output which is indicative of the vibrational amplitude of the associated vibrator, comparator means coupled to the outputs of said signal pick-up means adapted to produce a differential output indicative of the difference in amplitude between said vibrators, and indicator means responsive to said differential output.

4. A signal integrator for detecting low frequency signals comprising, a first vibratory system including a pair of reeds, a second vibratory system including a pair of reeds, said first and second systems being tuned to vibrate at the same frequency, driving means associated with each said system adapted to cause said systems to vibrate in phase with predetermined amplitudes at a selected multinode frequency, signal insertion means associated with each reed of said first vibratory system at a point intermediate thereof, said signal insertion means being adapted to inject discrete signal energy into the associated reed whereby said injected energy will travel by wave motion along said reed, signal pick-up means associated with each of said vibratory systems adapted to produce an output which is indicative of the instantaneous vibrational amplitude of the associated system and comparator means coupled to the outputs of said signal pick-up means adapted to produce a differential output indicative of the difference in amplitude of said vibratory systems.

5. In a signal detector of the type employing a resonant mechanical system having a reed driven to vibrate at a multi-node frequency, a signal insertion system comprising a pair of signal insertion units disposed on opposite sides of said reed, each of said units being adapted to inject discrete energy into said vibrating reed, signal and noise reception means coupled to one of said units, and a source of compatible noise coupled to the other of said units.

6. A self-excited system for driving a pair of mechanical vibrators in synchronism comprising, a pair of identical needs, a support, said reeds being mounted at their longitudinal centers to said support on opposite sides thereof to form an H whereby each reed is divided into two arms, a plurality of magnetic units, each of said magnetic units comprising a reed mounted armature and a stationary magnetic core carrying a signal coil, said armature being adapted to be attracted by said magnetic core, each arm of said H having associated therewith a pair of magnetic units disposed on opposite sides of the arm, a push-pull amplifier, means serially coupling the signal coils of the magnetic units disposed interiorly of said H to one output side of said amplifier, means serially coupling the signal coils of the magnetic units disposed externally of said H to the other output side of said amplifier, and excitation means coupled to the input of said amplifier for supplying push-pull excitation thereto, said excitation means comprising a pair of magnetic units disposed on opposite sides of one arm of said H.

No references cited